United States Patent [19]

Alexander

[11] Patent Number: 4,702,505
[45] Date of Patent: Oct. 27, 1987

[54] CONVERTIBLE TOP LATCH MECHANISM

[75] Inventor: Michael P. Alexander, Grosse Ile, Mich.

[73] Assignee: ASC Incorporated, Southgate, Mich.

[21] Appl. No.: 647,655

[22] Filed: Sep. 6, 1984

[51] Int. Cl.$^4$ .............................................. E05C 5/04
[52] U.S. Cl. ............................ 292/251; 292/DIG. 5; 292/341.18; 296/120 A
[58] Field of Search ................... 292/DIG. 5, 251, 58, 292/341.18, 341.19; 296/120

[56] References Cited

U.S. PATENT DOCUMENTS

| | | | |
|---|---|---|---|
| 1,869,815 | 8/1932 | Katz | 292/341.18 |
| 2,401,854 | 6/1946 | Berry, Jr. | 292/341.19 |
| 2,873,991 | 2/1959 | Larimore et al. | 292/58 X |
| 2,967,557 | 1/1961 | Gait et al. | 292/251 X |
| 3,033,609 | 5/1962 | Goldo | 292/DIG. 5 X |
| 3,476,437 | 11/1969 | Schroeder et al. | 296/137 |
| 3,494,659 | 2/1970 | Trenkler | 296/137 |
| 3,550,412 | 12/1970 | Pitel et al. | 292/341.18 X |
| 3,610,681 | 10/1971 | Trenkler | 296/137 R |
| 4,238,876 | 12/1980 | Monroe et al. | 29/401.1 |
| 4,337,974 | 7/1982 | Kohlpaintner et al. | 296/214 |

Primary Examiner—Richard E. Moore
Attorney, Agent, or Firm—Arnold S. Weintraub

[57] ABSTRACT

A latching mechanism for an automotive vehicle and, in particular, a convertible-type or a movable-type vehicle includes a three-dimensional, two-component positionally adjustable assembly which is mounted to the vehicle and includes a screw-type projection which is received in a keeper disposed proximate the windshield header of the vehicle. A handle is permanently affixed to the pin to facilitate rotation of the pin into and out of the keeper for latching and unlatching, as desired.

8 Claims, 4 Drawing Figures

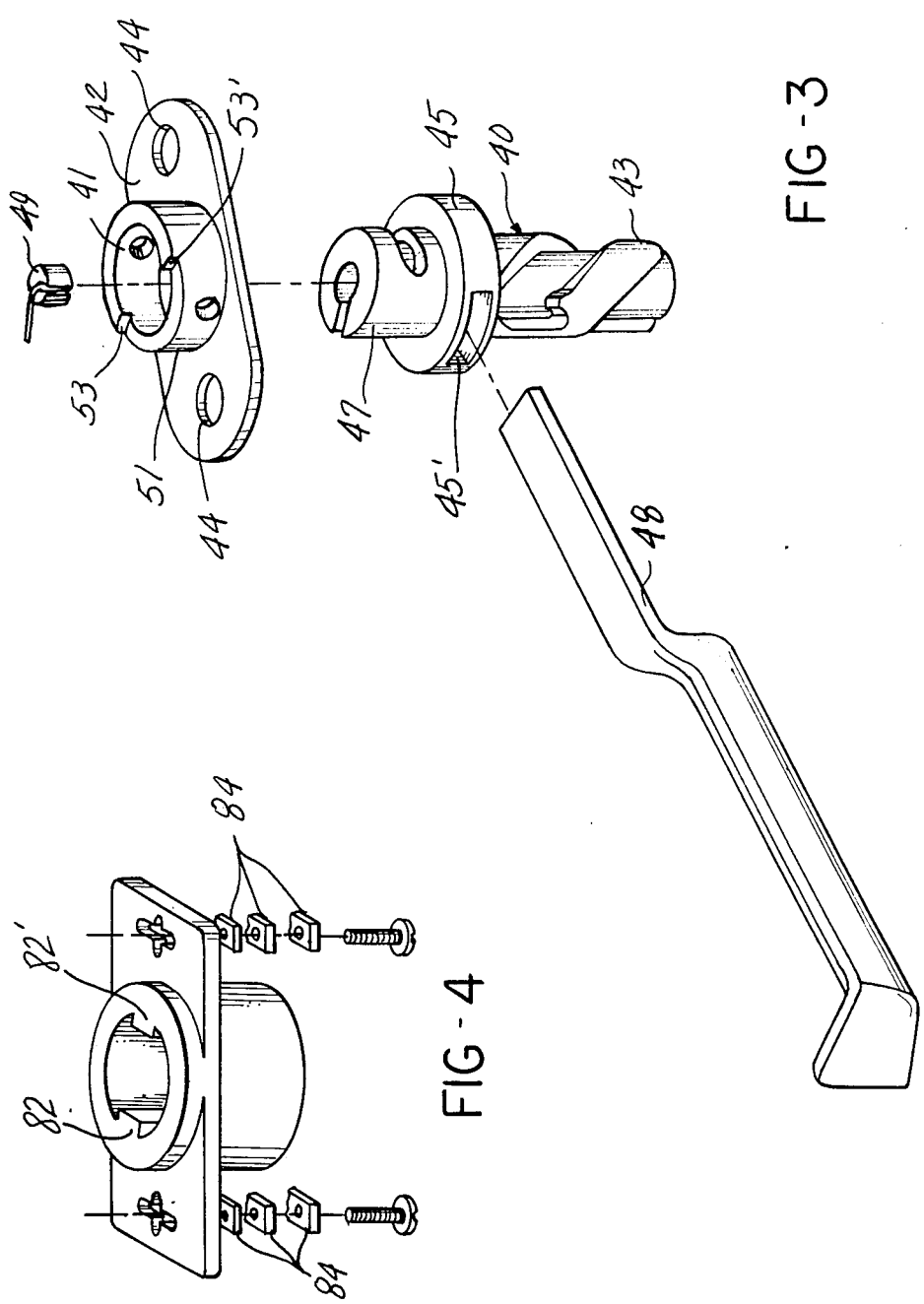

CONVERTIBLE TOP LATCH MECHANISM

BACKGROUND OF THE INVENTION

1. Field of the Invention

The present invention concerns automotive roof top locking assemblies. More particularly, the present invention concerns latching mechanisms for automotive roof tops. Even more particularly, the present invention concerns latching mechanisms for "convertible-type" and other movable-type roofs for automotive vehicles.

2. Prior Art

As is known to those skilled in the art to which the present invention pertains the latching of collapsible and/or removable roof top mechanisms for automotive structures is an area which causes great concern in the mass production of such vehicles. Because of inherent tolerances built into the systems it is often quite difficult to uniformly produce vehicles which will provide consistent, effective latching. Most often, there is the need to constantly adjust the latch mechanism whereby effective mating between a latch and a keeper can be effected in order to provide adequate sealing and locking. In order to attempt to alleviate these problems the art has sought various solutions. For example U.S. Pat. No. 3,610,681 teaches a tension locking device located at the front windshield header which includes a threadable sleeve nut for varying the tension applied to the locking device. A clamping lock is located at the rear of the roof section and includes an elastic claw-like connecting member. A similar structure is found in U.S. Pat. No. 3,494,659. Both of these pertain to detachable roof sections and are inadequate for use in convertibles.

U.S. Pat. No. 3,476,437 teaches a latching mechanism including a handle-pivoted bolt, which engages a slot formed in structure mounted on the windshield frame, for aligning the removable top of the vehicle. However, again, this structure is not readily adapted for use with convertible-type vehicles.

Because of the renewed interest in convertible-type vehicles there exists a need for latching mechanisms which provide positive latching between the convertible roof top and the body of the vehicle which can be readily adjusted at the point of production to facilitate high production of these vehicles, without loss of sufficient latching capability.

As will subsequently be detailed the present invention provides a positive latching system with assembly.

SUMMARY OF THE INVENTION

The present invention provides a latching assembly, particularly adapted for convertible-type vehicles, which comprises a screw-type latch affixed to the undersurface of a movable roof top. Secured to he latch is a handle for rotating the screw-type latch between a locking and unlocking position. An adjustable keeper assembly mounted to the vehicle body receives the latch, for mating between the roof top and the vehicle body.

The keeper assembly includes a bezel and lock ring secured thereto. The bezel provides horizontal adjustment of the keeper, whlie the lock ring provides vertical adjustment for the keeper assembly.

For a more complete understanding of the present invention reference is made to the following detailed description and accompanying drawing.

In the drawing like reference characters refer to like parts throughout the several views in which:

BRIEF DESCRIPTION OF THE DRAWING

FIG. 3 is an exploded, perspective view of a latch employed in the practice of the present invention; and FIG. 4 is a perspective view of an alternate embodiment of a keeper assembly useful in the practice of the present invention.

DESCRIPTION OF THE PREFERRED EMBODIMENTS

Figure 1:
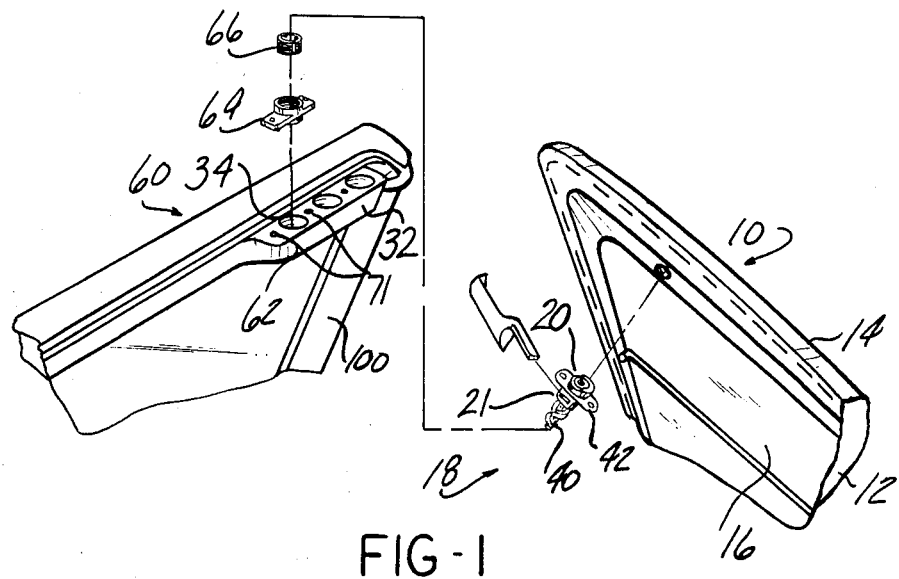
FIG. 1 is an exploded, perspective view of a latch assembly in accordance with the present invention.
Figure 2:
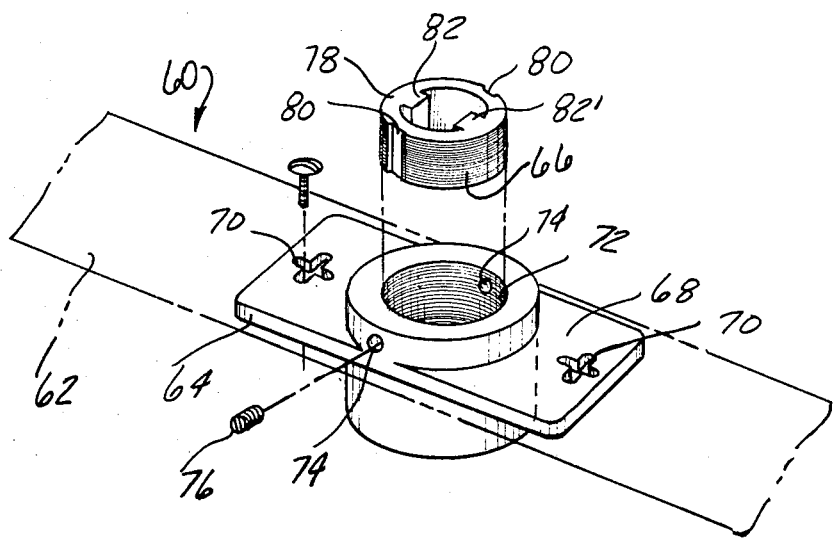
FIG. 2 is an exploded, perspective view of a keeper assembly employed in the practice hereof.

Now, and with reference to the drawing, there is depicted therein a vehicle roof top of the type, generally known as a "convertible", and indicated at 10. At the outset it should be noted that the construction of the convertible top, per se, does not constitute part of the present invention. Neither does the retraction mechanism for the convertible top, itself, constitute part of the present invention. The construction of the top and the retraction mechanism are well known to those skilled in the art to which the present invention pertains.

Generally, the retractable roof portion 10 is formed from a cloth or a similar type of fabric 12 which has an upper or outer surface 14 and an under surface 16.

Disposed proximate the front or forward portion of the retractable roof portion of the vehicle, on lateral sides thereof, is an upper latching mechanism 18 in accordance with the present invention. The upper latching mechanism, generally, includes a housing 20 which is secured to the undersurface 16 of the roof 10 of the vehicle to enclose a latch assembly 21. A latch assembly 21 is disposed within a housing (not shown) which decoratively enshrouds the latch assembly. Although not shown the housing has suitable openings formed therein for permitting the latch assembly components to project therethrough.

As shown in the drawing, the latch assembly 21 comprises a screw-type or helical latching projection 40 which is rotatably mounted onto a plate 42. The projection 40 projects through the opening 34 formed in the base wall 32 and a mounting plate 42.

The projection 40 has a first free end which projects through the opening 34 and a second end which projects through an opening 41 formed in the mounting plate 42. The projection 40, generally, comprises a first helical lower end 43 which terminates in an enlarged diameter section 45 which having a slot 45' formed therethrough. The section 45 abuts against the mounting plate 42, as shown.

The projection 40 has a threaded second reduced section 47 which projects through the mounting plate 42. A stop member, such as a pin 49, which limits rotation of the projection with respect to the mounting plate 42, is affixed thereto to the upper end of the section 47 by any suitable mode.

The plate 42 is affixed to the top wall of the housing through suitable fasteners (not shown) which project through apertures 44 formed in the mounting plate. The plate 42, as noted, has a central threaded opening 41 formed therein through which the second reduced section 47 of the projection 40 extends. An upstanding enclosure 51 is integrally formed about the opening 41 and extends upwardly therefrom. The enclosure 51 retains the second reduced section of the projection therewithin. The upper edge of the enclosure has a pair of radially spaced shoulders 53,53' against which the stop member 49 may abut to limit rotation of the projection with respect to the mounting plate.

Internally, the enclosure 51 is threaded in a manner complimentarily to that of the second reduced section of the projection so that the projection threadingly engages the mounting plate 42.

In assembling the mechanism 18, the projection and mounting plate are threadingly joined, first, and then, the pin 49 is affixed to the projection to limit the rotation thereof with respect to plate 42.

Permanently affixed to the projection 40 and fitted into the slot 45' and projecting radially outwardly therefrom is a handle 48. The handle is of any suitable configuration which permits easy grasping thereof. The handle 48 is affixed to the projection through the slotted, enlarged section.

The handle 48 facilitates rotation of the projection or pin through a 100° to 110° horizontal rotation.

As shown in the drawing, affixed to the main body of the vehicle proximate the windshield header 100 is an adjustable lower latch or keeper assembly 60 which removably receives the projection 40. The keeper assembly 60, generally, comprises a housing (not shown) which receives an adjustable bezel 64 and lock ring 66.

The housing 62 is a walled member secured to the vehicle proximate the header 100 for, essentially, aesthetic reasons.

Fixed within the housing is the adjustable bezel 64. The bezel or lock ring bezel comprises a planar member or plate 68 having a pair of spaced apart slotted apertures 70. The slotted apertures register with suitable openings 71 formed in the housing and receive suitable fasteners (not shown) to secure the plate 68 to the housing. By providing the slotted apertures in the bezel 64 there is afforded horizontal planar adjustment thereof, based upon proper placement of the threaded fasteners in the slot(s).

The bezel, also, includes a central cylindrical opening 72. The cylindrical opening 72 is internally threaded along the extent of its vertical axis. The opening has a plurality of tapped openings 74 formed therein which receive set screws 76 for fixing the lock ring 66 in position.

The lock ring 66 is a threaded, hollow cylindrical member 78 having an external thread formed about its exterior surface along the vertical extent thereof. The ring 66 is threadingly mounted to the bezel 64 via the threaded opening 72 which threadingly receives the ring 66. A pair of diametrically opposed, external longitudinal slots or channels 80 are formed on the member 78 and receive corresponding set screws therewithin to fix the lock ring in appropriate position, in an apparent manner.

Disposed within the hollow interior of the member 78 and extending laterally inwardly is a pair of opposed pins 82,82'. The pins mate with the threads of the projection 40 to retain the projection 40 in the keeper assembly 60. It is to be appreciated that the lock ring 66 affords vertical adjustment of the latch assembly by enabling varying degrees of threaded interengagement with the bezel. The set screws maintain the lock ring in adjusted position.

Thus, and in accordance with the present invention, when latching of the roof is desired the pin or projection 40 is engaged with the lock ring and the handle is rotated through about 100° of to about 110° rotation. Rotation of the handle causes the projection 40 to threadably engage the pins 82,82' formed in the lock ring, as well as threaded rotational engagement of the opening 41, to securely lock the roof to the vehicle body. Release of the projection is achieved by rotating the handle in an opposite direction from about 100° of to 110° rotation.

It is to be appreciated that alternate modes for achieving adjustability and interengagement are practicable. For example, the projection 40 can be fixed in position and the locking ring can be rotated into locking engagement therewith.

Alternatively, in lieu of a rotating locking ring, and as shown in FIG. 4, the central opening of the bezel can have the pins 82,82' fixedly mounted therewithin. To achieve vertical adjustment, the bezel 64 can, then, be shmmed up and down via shims 84.

Also, it is possible and is contemplated hereby that a security locking mechanism be associated with the mechanism. For example, a key lock can enshroud the projection or pin 40 to lock it in position or any other suitable locking device can be associated with the handle, etc.

Having, thus, described the invention, what is claimed is:

1. In a vehicle having a foldable vehicle rood assembly foldable over the stationary structure of the vehicle improvement comprising a latch mechanism for releasably latching the foldable roof assembly to the stationary structure of the vehicle, the latch mechanism comprising:
    a helical projection mounted on the movable roof assembly of the vehicle;
    a keeper mounted on the stationary structure of the vehicle for removably receiving the projection, the keeper comprising:
    a bezel plate, the bezel plate having a central bore;
    a lock ring movably mounted in the central bore of the bezel plate and mounted for axial movement with respect to the bezel plate in a plane normal to the bezel plate to afford vertical adjustment of the latch mechanism; and
    means formed in the lock ring for releasably retaining the projection in the bezel plate.

2. The mechanism of claim 1 wherein:
    the bezel plate has a plurality of slotted apertures formed therein, the slotted apertures permitting horizontal positional adjustment of the bezel plate with respect to the stationary structure of the vehicle.

3. The mechanism of claim 2 which further comprises:
    at least one shim fixedly secured to the bezel plate to permit adjustment of the keeper in the same axial direction as that of the projection.

4. The mechanism of claim 1 which further comprises:
    means for rotating the lock ring into engagement with the projection.

5. The mechanism of claim 1 which further comprises:
    a mounting plate, affixed to the vehicle, the projection being rotatably mounted to the mounting plate.

6. The mechanism of claim 5 which further comprises:

means for rotating the projection into and out of engagement with the means for releasably retaining.

7. The mechanism of claim 6 wherein the means for rotating comprises:
a handle secured to the projection.

8. The mechanism of claim 5 which further comprises:
means proximate the upper end of the projection for limiting rotation of the projection into the means for releasably retaining.

* * * * *